(12) United States Patent
Wang et al.

(10) Patent No.: US 12,088,957 B2
(45) Date of Patent: Sep. 10, 2024

(54) VIDEO PROCESSING METHOD AND DEVICE, TERMINAL, AND STORAGE MEDIUM

(71) Applicant: BEIJING BYTEDANCE NETWORK TECHNOLOGY CO., LTD., Beijing (CN)

(72) Inventors: Lili Wang, Beijing (CN); Dong Wang, Beijing (CN); Chi Fang, Beijing (CN); Wei Gao, Beijing (CN); Haizhou Zhu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/733,958

(22) Filed: Apr. 29, 2022

(65) Prior Publication Data

US 2022/0264053 A1   Aug. 18, 2022

Related U.S. Application Data

(63) Continuation of application No. PCT/CN2020/124036, filed on Oct. 27, 2020.

(30) Foreign Application Priority Data

Oct. 30, 2019 (CN) .......................... 201911047141.8

(51) Int. Cl.
*H04N 5/77* (2006.01)
*G11B 27/031* (2006.01)
(Continued)

(52) U.S. Cl.
CPC ............. *H04N 5/77* (2013.01); *G11B 27/031* (2013.01); *H04N 5/268* (2013.01); *H04N 9/8211* (2013.01)

(58) Field of Classification Search
None
See application file for complete search history.

(56) References Cited

U.S. PATENT DOCUMENTS 7,823,056 B1 * 10/2010 Davey ................... G11B 27/34
715/202
8,665,333 B1 *  3/2014 Sharma ............ G08B 13/19643
348/169
(Continued)

FOREIGN PATENT DOCUMENTS

CN       101388988 A      3/2009
CN       102568260 A      7/2012
(Continued)

OTHER PUBLICATIONS

International Patent Application No. PCT/CN2020/124036; Int'l Search Report; dated Feb. 2, 2021; 3 pages.
(Continued)

*Primary Examiner* — Gelek W Topgyal
(74) *Attorney, Agent, or Firm* — BakerHostetler (57) ABSTRACT

The embodiments of the disclosure provide a video processing method and device, terminal and storage medium. The method includes: turning on a first camera located at a first side of a terminal so as to obtain a first video stream through the first camera; turning on a second camera located at a second side of the terminal so as to obtain a second video stream through the second camera; receiving a switching command and performing a preset switching operation on the first video stream and the second video stream according to the switching command; recording receiving time of the switching command; and generating timeline information according to the receiving time and the preset switching operation. In the method of the disclosure, by recording the receiving time of the switching command and generating the
(Continued)

timeline information, more flexible choices may be provided for subsequent video presentation and editing.

20 Claims, 3 Drawing Sheets

(51) Int. Cl.
  *H04N 5/268* (2006.01)
  *H04N 9/82* (2006.01)

(56) References Cited

U.S. PATENT DOCUMENTS

| | | | |
|---|---|---|---|
| 8,953,079 | B2 | 2/2015 | Raju et al. |
| 9,325,903 | B2 | 4/2016 | Kim et al. |
| 9,349,414 | B1 | 5/2016 | Furment et al. |
| 9,491,367 | B2 | 11/2016 | Lee et al. |
| 9,509,916 | B2 | 11/2016 | Li et al. |
| 9,565,333 | B2 | 2/2017 | Kim et al. |
| 9,578,233 | B2 | 2/2017 | Aoyama et al. |
| 10,007,476 | B1 | 6/2018 | Glikmann |
| 10,136,069 | B2 | 11/2018 | Kim et al. |
| 10,200,599 | B1 | 2/2019 | Baldwin |
| 10,511,757 | B2 | 12/2019 | Yoshizawa et al. |
| 10,652,198 | B1 | 5/2020 | Morrison et al. |
| 10,693,956 | B1 | 6/2020 | Green et al. |
| 10,944,908 | B2 | 3/2021 | An et al. |
| 11,012,639 | B2 | 5/2021 | Kim et al. |
| 11,115,591 | B2 | 9/2021 | Wei |
| 11,115,598 | B2 | 9/2021 | Yim et al. |
| 11,258,736 | B2 | 2/2022 | Shelley |
| 11,412,276 | B2 * | 8/2022 | Bloch ............... H04N 21/2365 |
| 11,470,051 | B1 | 10/2022 | Berkas et al. |
| 11,765,463 | B2 | 9/2023 | Li et al. |
| 2004/0179816 | A1 * | 9/2004 | Takehana ............ G11B 27/032 386/281 |
| 2005/0232586 | A1 * | 10/2005 | Tsuchiya ............ G11B 27/107 |
| 2009/0141981 | A1 | 6/2009 | Chan |
| 2010/0077289 | A1 * | 3/2010 | Das ................. G06F 16/58 715/230 |
| 2010/0251109 | A1 | 9/2010 | Jin et al. |
| 2010/0281375 | A1 | 11/2010 | Pendergast et al. |
| 2012/0081392 | A1 | 4/2012 | Arthur |
| 2012/0120186 | A1 | 5/2012 | Diaz et al. |
| 2012/0268552 | A1 | 10/2012 | Choi et al. |
| 2012/0274808 | A1 | 11/2012 | Chong et al. |
| 2013/0111366 | A1 | 5/2013 | Silbey et al. |
| 2013/0125000 | A1 * | 5/2013 | Fleischhauer ...... H04N 21/2743 715/723 |
| 2013/0227414 | A1 * | 8/2013 | Hwang ............... G06F 16/743 715/719 |
| 2013/0235224 | A1 | 9/2013 | Park et al. |
| 2013/0298026 | A1 | 11/2013 | Fitzpatrick |
| 2013/0329100 | A1 * | 12/2013 | Desai .................. H04N 5/2258 348/262 |
| 2014/0047371 | A1 * | 2/2014 | Palmer ............... H04N 21/4622 715/771 |
| 2014/0192212 | A1 | 7/2014 | He et al. |
| 2014/0229544 | A1 | 8/2014 | Evans et al. |
| 2014/0232904 | A1 * | 8/2014 | Na ...................... H04N 5/2355 348/239 |
| 2014/0232906 | A1 * | 8/2014 | Ha ...................... H04N 5/265 348/239 |
| 2014/0240551 | A1 | 8/2014 | Kim et al. |
| 2014/0267842 | A1 | 9/2014 | Lee et al. |
| 2014/0324605 | A1 | 10/2014 | Steelberg et al. |
| 2015/0062434 | A1 | 3/2015 | Deng et al. |
| 2015/0163562 | A1 | 6/2015 | Leventhal et al. |
| 2015/0277638 | A1 | 10/2015 | Bustamante |
| 2015/0288742 | A1 | 10/2015 | Flynn et al. |
| 2015/0363811 | A1 | 12/2015 | Candillier |
| 2016/0224767 | A1 | 8/2016 | Steelberg |
| 2016/0248864 | A1 | 8/2016 | Lola et al. |
| 2016/0249108 | A1 * | 8/2016 | Sexton ............... H04N 21/4622 |
| 2016/0284383 | A1 * | 9/2016 | Kozakura ............ G11B 27/34 |
| 2016/0366294 | A1 | 12/2016 | Uroskin et al. |
| 2017/0064208 | A1 | 3/2017 | Salimpour et al. |
| 2017/0085803 | A1 * | 3/2017 | Chin .................... H04N 23/631 |
| 2017/0094019 | A1 | 3/2017 | Ahmed et al. |
| 2017/0195615 | A1 * | 7/2017 | Han ..................... G09G 5/14 |
| 2017/0201714 | A1 | 7/2017 | Kim et al. |
| 2017/0256288 | A1 | 9/2017 | Ai et al. |
| 2017/0289462 | A1 | 10/2017 | Eum et al. |
| 2017/0337652 | A1 | 11/2017 | Sarin |
| 2018/0033153 | A1 * | 2/2018 | Hirasawa ............ G06F 18/00 |
| 2018/0196472 | A1 | 7/2018 | Lee |
| 2018/0234589 | A1 | 8/2018 | Xiao |
| 2018/0376078 | A1 | 12/2018 | Adachi et al. |
| 2019/0005253 | A1 | 1/2019 | Floury et al. |
| 2019/0014372 | A1 | 1/2019 | Kandagal et al. |
| 2019/0019926 | A1 | 1/2019 | Lee et al. |
| 2019/0075066 | A1 | 3/2019 | Cho et al. |
| 2019/0087938 | A1 | 3/2019 | Iddings et al. |
| 2019/0174056 | A1 | 6/2019 | Jung et al. |
| 2019/0199926 | A1 | 6/2019 | An et al. |
| 2019/0288972 | A1 | 9/2019 | Morrison |
| 2019/0342616 | A1 | 11/2019 | Domm et al. |
| 2020/0099838 | A1 | 3/2020 | Song et al. |
| 2020/0106952 | A1 | 4/2020 | Missig et al. |
| 2020/0223454 | A1 | 7/2020 | Fox et al. |
| 2020/0302414 | A1 | 9/2020 | Pachera |
| 2021/0014415 | A1 | 1/2021 | Wei |
| 2021/0021295 | A1 | 1/2021 | Yun et al. |
| 2021/0026511 | A1 | 1/2021 | Ye et al. |
| 2021/0027576 | A1 * | 1/2021 | Nelson ............... G07F 17/3211 |
| 2021/0051295 | A1 | 2/2021 | Khawam |
| 2021/0067741 | A1 | 3/2021 | Yoshizawa et al. |
| 2021/0099407 | A1 | 4/2021 | Al Majid et al. |
| 2021/0152753 | A1 | 5/2021 | Zhu |
| 2021/0297604 | A1 | 9/2021 | Matiossian |
| 2022/0159183 | A1 | 5/2022 | Li et al. |
| 2022/0239832 | A1 | 7/2022 | Tyagi et al. |
| 2022/0294992 | A1 | 9/2022 | Manzari et al. |
| 2022/0377254 | A1 | 11/2022 | Wang et al. |
| 2023/0007085 | A1 | 1/2023 | Berliner et al. |
| 2023/0076870 | A1 | 3/2023 | Arnold et al. |
| 2023/0088720 | A1 | 3/2023 | Wang et al. |

FOREIGN PATENT DOCUMENTS

| | | |
|---|---|---|
| CN | 102938825 A | 2/2013 |
| CN | 103745736 A | 4/2014 |
| CN | 104104870 A | 10/2014 |
| CN | 104980659 A | 10/2015 |
| CN | 105009566 A | 10/2015 |
| CN | 105103535 A | 11/2015 |
| CN | 105376396 A | 3/2016 |
| CN | 106060526 A | 10/2016 |
| CN | 106165430 A | 11/2016 |
| CN | 106210629 A | 12/2016 |
| CN | 106231095 A | 12/2016 |
| CN | 106559686 A | 4/2017 |
| CN | 106662965 A | 5/2017 |
| CN | 106851162 A | 6/2017 |
| CN | 106973234 A | 7/2017 |
| CN | 107105315 A | 8/2017 |
| CN | 107509029 A | 12/2017 |
| CN | 107566725 A | 1/2018 |
| CN | 107846547 A | 3/2018 |
| CN | 108234891 A | 6/2018 |
| CN | 108419016 A | 8/2018 |
| CN | 109089059 A | 12/2018 |
| CN | 109151537 A | 1/2019 |
| CN | 109167937 A | 1/2019 |
| CN | 109729266 A | 5/2019 |
| CN | 110166652 A | 8/2019 |
| CN | 110740261 A | 1/2020 |
| CN | 110784674 A | 2/2020 |
| CN | 110809100 A | 2/2020 |
| CN | 110830714 A | 2/2020 |
| CN | 111143662 A | 5/2020 |
| CN | 112004032 A | 11/2020 |
| CN | 112445389 A | 3/2021 |

(56) References Cited

FOREIGN PATENT DOCUMENTS

| | | |
|---|---|---|
| CN | 306373989 S | 3/2021 |
| CN | 113422903 A | 9/2021 |
| CN | 113497894 A | 10/2021 |
| CN | 114979495 A | 8/2022 |
| CN | 115334246 A | 11/2022 |
| EP | 1841225 A3 | 3/2008 |
| WO | WO 2021/136268 A1 | 7/2021 |

OTHER PUBLICATIONS

International Patent Application No. PCT/CN2020/124038; Int'l Search Report; dated Jan. 11, 2021; 4 pages.
"Android implements the View style that follows the finger drag and automatically sticks to the edge (example demo)"; https://www.jb51.net/article/102952.htm; JB51.Net Inc.; Jan. 2017; accessed Apr. 29, 2022; 7 pages (English Translation).

* cited by examiner

VIDEO PROCESSING METHOD AND DEVICE, TERMINAL, AND STORAGE MEDIUM

CROSS REFERENCE TO RELATED APPLICATIONS

This application is a continuation of PCT application No. PCT/CN2020/124036, filed on Oct. 27, 2020, which field based on the Chinese patent application with the application number of 201911047141.8, filed on Oct. 30, 2019, and entitled "Video Processing Method and Device, Terminal, and Storage Medium", and claims the priority of this Chinese patent application, the entire content of both of which is hereby incorporated by reference.

FIELD

The embodiments of the disclosure relate to the field of computer technology, in particular to a video processing method and device, a terminal and a storage medium.

BACKGROUND

Current video recording methods are poor in diversity, which also limits subsequent video processing methods. Therefore, further improvement is needed to enhance user experience.

SUMMARY

This Summary is provided to introduce concepts in a simplified form that are described in detail in the Detailed Description section that follows. This summary section is not intended to identify key features or essential features of the claimed technical solution, nor is it intended to be used to limit the scope of the claimed technical solution.

In order to solve the above problems, the present disclosure provides a video processing method and device, terminal and storage medium. The present disclosure utilizes the cameras on both sides of the terminal to perform video recording at the same time, so that two-channel videos can be obtained, the video recording method is improved, and the two video channels are displayed in a time axis, so that the user can more intuitively know which video channel the displayed video belongs to.

An embodiment of the present disclosure, provided a video processing method, comprising: turning on a first camera located at a first side of a terminal so as to obtain a first video stream through the first camera; turning on a second camera located at a second side of the terminal so as to obtain a second video stream through the second camera; receiving a switching command and performing a preset switching operation on the first video stream and the second video stream according to the switching command; recording receiving time of the switching command; and generating timeline information according to the receiving time and the preset switching operation, the timeline information being used to indicate a corresponding relationship between the receiving time and the preset switching operation.

An embodiment of the present disclosure, provided a video processing device, comprising: a camera enabling module, configured to turn on a first camera located at a first side of a terminal and turn on a second camera located at a second side of the terminal, so as to obtain a first video stream through the first camera and a second video stream through the second camera; a switching module, configured to receive a switching command and perform a preset switching operation on the first video stream and the second video stream according to the switching command; a recording module, configured to record receiving time of the switching command; and a timeline generation module, configured to generate timeline information according to the receiving time and the preset switching operation, the timeline information being used to indicate a corresponding relationship between the receiving time and the switching operation.

An embodiment of the present disclosure, provided a video playing method, comprising: receiving a video to be played, wherein the video to be played comprises a first video stream, a second video stream and timeline information, and the timeline information indicates a corresponding relationship between receiving time of a switching operation on the first video stream and the second video stream and the switching operation; and correspondingly displaying the first video stream and the second video stream according to the timeline information.

An embodiment of the present disclosure, provided a video editing method, comprising: receiving a video to be edited, wherein the video to be edited comprises at least two video streams and timeline information, and the timeline information indicates a corresponding relationship between receiving time of a switching operation on the at least two video streams and the switching operation; and editing the video to be edited based on the timeline information and the at least two video streams.

An embodiment of the present disclosure, provided a terminal, comprising: at least one memory and at least one processor; wherein the memory is used for storing program codes, and the processor is used for calling the program codes stored in the memory to execute the video processing method above.

An embodiment of the present disclosure, provided a computer storage medium, storing program codes for executing the video processing method above.

In a video processing method of the disclosure, by recording the receiving time of a switching command and generating timeline information, more flexible choices may be provided for subsequent video presentation and editing.

BRIEF DESCRIPTION OF THE DRAWINGS

The above and other features, advantages and aspects of various embodiments of the disclosure will become more apparent in combination with the accompanying drawings and with reference to the following detailed description. Throughout the drawings, the same or similar reference numerals refer to the same or similar elements. It should be understood that the drawings are schematic, and components and elements are not necessarily drawn to scale.

DETAILED DESCRIPTION OF THE EMBODIMENTS

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather are provided for the purpose of a more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, i.e., "including but not limited to". The term "based on" is "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that the concepts such as "first" and "second" mentioned in the present disclosure are only used to distinguish different devices, modules or units, and are not used to limit the order of functions performed by these devices, modules or units or interdependence.

It should be noted that the modifications of "a" and "a plurality" mentioned in the present disclosure are illustrative rather than restrictive, and those skilled in the art should understand that unless the context clearly indicates otherwise, they should be understood as "one or a plurality of". multiple".

The current video recording method of the terminal is relatively limited in application scenarios. For example, when shooting a beautiful scenery, if you want to capture the feelings expressed or what the photographer wants to say, you can only shoot the perfect scene, and then point the camera at the photographer himself or switch the camera used for shooting (for example, switch from rear to forward). This shooting experience is not friendly. In addition, this shooting method cannot reproduce the beautiful scenery and the picture of the photographer at the same moment, and the application scene is relatively limited.

In the present disclosure, a smartphone is taken as an example for description to better understand the present disclosure. However, it should be understood that the terminals in the present disclosure may include, but are not limited to, such as mobile phones, smart phones, notebook computers, PDAs (personal digital assistants), PADs (tablets), PMPs (portable multimedia players), navigation devices, vehicle-mounted terminals Mobile terminal equipment such as equipment, vehicle display terminal, vehicle electronic rearview mirror, etc., and fixed terminal equipment such as digital TV, desktop computer, etc.

Figure 1:
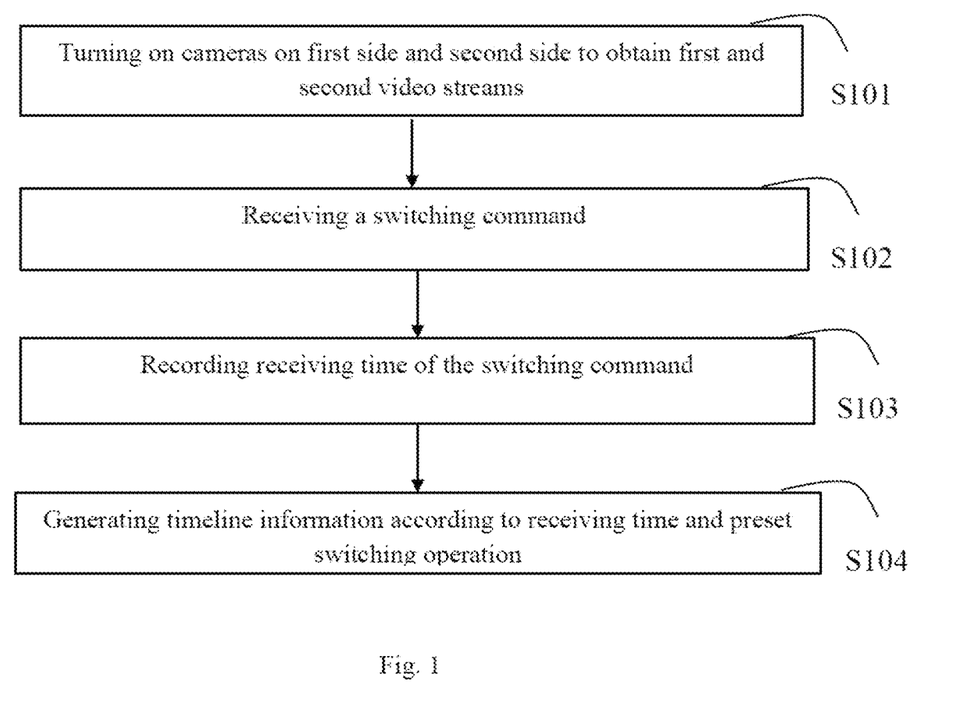
FIG. 1 is a flowchart of a video processing method according to an embodiment of the disclosure.

FIG. 1 provides a flowchart of an example method for video processing according to an embodiment of the disclosure. The method of the disclosure includes step S101, turning on a first camera located at a first side of a terminal so as to obtain a first video stream through the first camera, and turning on a second camera located at a second side of the terminal so as to obtain a second video stream through the second camera, wherein the first side and the second side may be opposite or have other positional relationships. In the disclosure, the first side and the second side of the terminal include but are not limited to a front side and a back side of the terminal, so that the first camera and the second camera include but are not limited to a front camera and a rear camera of the terminal. In addition, the first camera and the second camera each comprise one or more cameras. In addition, if the first camera or the second camera includes multiple cameras, it is not necessary that all the cameras need to work, instead, some cameras may work, and other cameras may be in an idle or unavailable state. In some embodiments, turning on the first camera and the second camera may be that the two cameras are turned on simultaneously, or one camera is turned on first and then the other camera is turned on so that the cameras are both turned on.

In some embodiments, during video recording, because the first and second cameras are both turned on for video recording, the first camera and the second camera respectively generate one video image, that is, two video files are generated from one time of video recording. A picture taken by the first camera forms the first video stream, and a picture taken by the second camera forms the second video stream. During video recording, the two video files may be independent, that is, they do not interfere with each other. For example, the first camera and the second camera respectively one video file. In some embodiments, the video recording method is improved by using the cameras on two sides of the terminal for video recording, so that more flexible choices may be provided for video presentation and editing. By obtaining two video streams, more flexible choices may be provided for video presentation and editing in the later stage, so that users can implement various editing ideas.

In some embodiments, at the same moment, one of the first camera and the second camera is in an on state and the other one of the first camera and the second camera is in an off state. Performing a preset switching operation on the first video stream and the second video stream according to a switching command includes: turning off the one, which is in the on state, of the first camera and the second camera, and turning on the other one, which is in the off state, of the first camera and the second camera. That is, the above-mentioned first video stream and second video stream may include video streams obtained simultaneously and also video streams obtained by switching the cameras in different time periods. If the video streams are obtained by switching the cameras, the above timeline information may also be obtained for later editing or other purposes, which will not be described in detail here.

The method of the disclosure further includes: step S102, receiving a switching command, and performing a preset switching operation on the first video stream and the second video stream according to the switching command. In some embodiments, the switching command may include commands such as click and voice. In some embodiments, performing the preset switching operation on the first video stream and the second video stream includes: switching display areas of the first video stream and the second video stream.

In some embodiments, the method of the disclosure further includes: step S103, recording receiving time of the switching command. In some embodiments, the method of the disclosure further includes: step S104, generating timeline information according to the receiving time and the preset switching operation, wherein the timeline information is used to indicate a corresponding relationship between the receiving time and the switching operation.

In some embodiments, by displaying two videos through the timelines, users may know which video is displayed in a more direct manner, or know which area is for displaying a video corresponding to a timeline in a more direct manner, and a time point of the switching operation may be reflected in a more direct manner so as to facilitate subsequent editing and other operations.

In some embodiments, during video recording, the terminal may simultaneously display the first video stream obtained by the first camera and the second video stream obtained by the second camera. In some embodiments, the first video stream is displayed in a first area of a display interface, and the second video stream is displayed in a second area of the display interface. For example, if the terminal is a mobile phone, the display interface is a display screen. In some embodiments, performing the preset switching operation on the first video stream and the second video stream according to the switching command includes: exchanging a display area where the first video stream is located and a display area where the second video stream is located. For example, originally, the first video stream is displayed in the first area and the second video stream is displayed in the second area, and after the preset switching operation is performed, the first video stream will be displayed in the second area and the second video stream will be displayed in the first area.

In some embodiments, an audio stream may also be obtained by video recording, which is used to be synthesized with the first video stream and/or the second video stream, so that the obtained video has corresponding audio. During video recording, one audio file and two video files are obtained in the same time period, wherein the audio file and two video files may be independent, that is, they do not interfere with each other. For example, a microphone may be used to obtain the audio file, and the first camera and the second camera may each obtain one video file. The audio stream is used to be synthesized with the first video stream and/or the second video stream, so that the obtained video has corresponding audio. By obtaining the two video streams and the audio streams in corresponding time periods, more flexible choices may be provided for video presentation and editing in the later stage, so that users can implement various editing ideas. It should be understood that not only may the audio file obtained during video recording be synthesized with the corresponding video file, but also other audio files and the captured video file may be synthesized and edited, etc. For example, other audio files include audio streams obtained by audio recording equipment, other audio files stored locally or audio files obtained from the network, etc. Therefore, more flexible choices may be further provided for video presentation and editing in the later stage, so that users can implement various editing ideas.

In some embodiments, the terminal simultaneously displays the first video stream and the second video stream in a preset mode (for example, picture in picture or split screen). In some embodiments, the terminal simultaneously displaying the first video stream and the second video stream may include: determining display area information of the first video stream and the second video stream, and then displaying the first video stream in a first area and the second video stream in a second area according to the display area information. Specifically, the display area of each video stream may be determined by a processor of the terminal, and then the video streams are displayed in the first area and the second area according to the determined display areas. In some embodiments, a size of the first area is different from that of the second area. That is, the display areas of the first video stream and the second video stream are different in size. In some embodiments, the first area is located in the second area, for example, a picture-in-picture video, and in this case, the first area may cover part of the second area. In some embodiments, the first area and the second area have no overlapping part. For example, the first video stream and the second video stream are displayed in a split screen manner.

Figure 2:
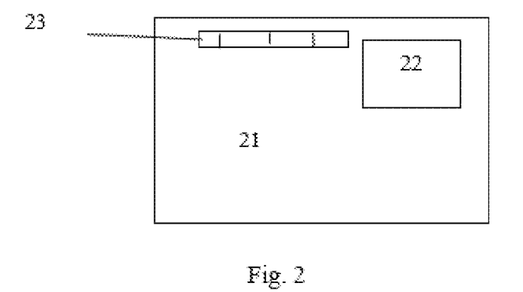
FIG. 2 is a schematic diagram of a video display mode according to an embodiment of the disclosure.
Figure 3:
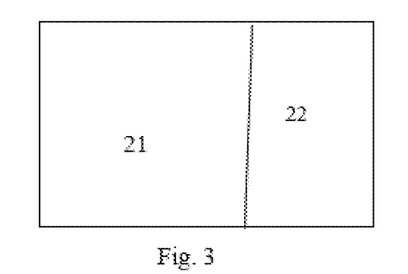
FIG. 3 is a schematic diagram of a video display mode according to an embodiment of the disclosure.

For example, as shown in FIG. 2, a first video stream 21 and a second video stream 22 displayed in a picture-in-picture manner are shown, wherein the second video stream 22 occupies part of the picture in the first video stream 21, that is, covers part of the picture in the first video stream 21. As shown in FIG. 3, a first video stream 21 and a second video stream 22 displayed in a split screen manner are shown, wherein the first video stream 21 and the second video stream 22 respectively occupy part of a display screen. In the embodiment of the disclosure, a display area of the first video stream 21 corresponds to the above-mentioned second area, and a display area of the second video stream 22 corresponds to the above-mentioned first area.

In some embodiments, during video recording, by displaying the first video stream and the second video stream in the terminal simultaneously, the content of the video obtained by the cameras may be watched in time, allowing users to easily select a filming direction or content during video recording.

In some embodiments, when watching the video obtained by the video processing method, the video which has the first video stream and the second video stream and contains the timeline information is displayed, and the video may be watched by using the above-mentioned terminal. As shown in FIG. 2, a timeline 23 is shown. The timeline 23 shows the corresponding time periods when the first video stream 21 and the second video stream 22 are displayed in one area (the second area corresponding to the first video stream 21 in FIG. 2). The timeline 23 may also show a switching time point of the first video stream 21 and the second video stream 22, that is, show the time point at which the video streams are switched in the second area. For example, in the display area where the first video stream 21 of FIG. 2 is located, the first video stream 21 is displayed in a first time period, the second video stream 22 is displayed in a second time period, and the first video stream 21 is displayed in a third time period. As the display areas are switched, the timeline 23 may record time periods during which the first video stream 21 is displayed in the area, and time periods during which the second video stream 22 is displayed.

In some embodiments, time periods corresponding to different video streams or different display areas on the timeline are represented by different visual elements. In some embodiments, the visual elements may include color, line form, transparency, etc. For example, the time periods corresponding to different video streams may be distinguished by color, for example, one time period is in red, another time period is in yellow, etc. By displaying these two videos through timelines, users may know which video is displayed in a more direct manner.

In some embodiments, if the first video stream 21 and the second video stream 22 are displayed in a split screen manner, the display areas of the first video stream 21 and the second video stream 22 may be the same or different. In some embodiments, the display area of one of the first video stream 21 and the second video stream 22 is larger than that of the other one of the first video stream 21 and the second video stream 22 if the first video stream 21 and the second video stream 22 are displayed in a preset manner (picture in picture or split screen). For example, as shown in FIGS. 2 and 3, the display area of the first video stream 21 is larger than that of the second video stream 22. In some embodiments, which area is for displaying the respective video streams may be selected through preset.

In some embodiments, if the first area is located in the second area (i.e., displaying in a picture-in-picture manner), the first area may be located at a corner of the second area, or the first area may be located in an area with the least influence on the content displayed in the second area. For example, in some embodiments, if displayed in a picture-in-picture manner, a smaller picture may be adsorbed onto four corners of a larger picture, for example, as shown in FIG. 2. In some embodiments, a position of the smaller picture is realized by intelligent recognition, that is, the smaller picture is adsorbed onto a position that has little influence on the display of the larger picture, for example, a position where people and scenery are scarce in the larger picture or a blank location.

Figure 4:
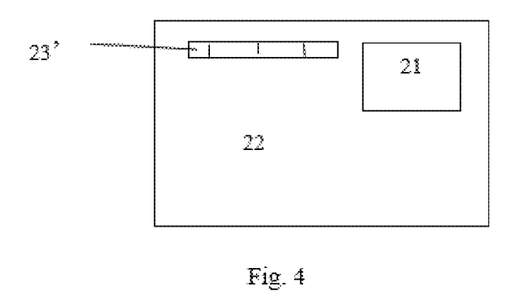
FIG. 4 is a schematic diagram of a video display mode according to an embodiment of the disclosure.
Figure 5:
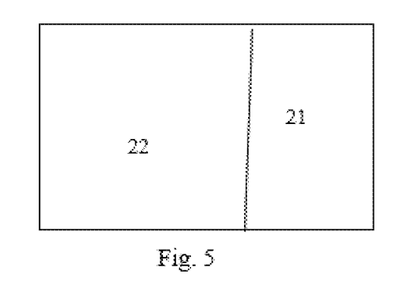
FIG. 5 is a schematic diagram of a video display mode according to an embodiment of the disclosure.

In some embodiments, during video recording, the display areas of the first video stream 21 and the second video stream 22 may be switched in response to a preset operation. For example, the preset operation may include a click trigger, a slide trigger, a voice command, etc., on the display areas of the first video stream 21 and the second video stream 22. FIG. 4 and FIG. 5 respectively show the display areas of the first video stream 21 and the second video stream 22 corresponding to FIGS. 2 and 3 after switching. After switching, updating is performed to obtain updated timeline information corresponding to the display of the first video stream and the second video stream, for example, the terminal may perform the updating to obtain the updated timeline information. In some embodiments, during video processing, if the timeline information is updated, the video will be displayed in a manner corresponding to the latest timeline when played or previewed next time. In some embodiments, the terminal records multiple pieces of timeline information, which may be selected by the user when videos are played next time, so as to play the video containing the corresponding timeline information.

As mentioned above, the time periods corresponding to the display of different video streams may be distinguished by different visual elements (e.g., colors), for example, one time period is in red, another time period is in yellow, etc. If the video streams displayed in the corresponding areas are switched, as shown in FIG. 4, the color of the timeline 23 may change to obtain a timeline 23', for example, an original red part turns yellow and an original yellow part turns red, which is the result in response to the change of the video stream displayed in the corresponding area. Furthermore, it should be understood that although no timeline is shown in FIG. 3 and FIG. 5, timelines may still exist.

In some embodiments, the timeline information may be output. By displaying the time period of the video stream displayed in a certain display area through timelines, the time point at which the video stream displayed in the display area is switched may be recorded, allowing the user to easily identify which video stream corresponds to the current display area, and also providing a variety of flexible choices for display and editing in the later stage.

In some embodiments, when the video recorded in the terminal is watched, the video which has the first video stream and the second video stream and contains the timeline information is displayed in the terminal. Through the first timeline, the user may know which video is displayed in a more direct manner, and know the switching time point of the displayed video stream in a more direct manner.

In some embodiments, the method further comprises: displaying the timeline information, wherein the timeline information includes time periods divided by time points, and the time points include time points at which switching operations occur, and the time periods correspond to switching information. In addition, the method further comprises: receiving an adjustment command, determining a time period corresponding to the adjustment command, and adjusting the switching information of the time period according to the adjustment command. In some embodiments, the adjustment command may include a click operation, a voice command, etc. In some embodiments, receiving the adjustment command and determining the time period corresponding to the adjustment command comprises: receiving a preset trigger operation and determining a trigger position corresponding to the trigger operation; and determining a time period corresponding to the trigger position on the timeline based on a display position of the timeline. In some embodiments, the trigger operation includes a click operation, a voice command, etc.

In some embodiments, after video recording is completed, the obtained first video stream 21 and/or second video stream 22 may be exported or shared to obtain an exported video which may include the first video stream 21, the second video stream 22, a synthetic video with the first video stream 21 and the second video stream 22 or a picture-in-picture video with the first video stream 21 and the second video stream 22. That is, the exported video may be either a single video stream or a combined video of two video streams. In addition, these videos may be combined with audios in corresponding time periods. In the synthetic video with the first video stream 21 and the second video stream 22, the same video recording time point may include only one video stream, may also include two video streams, or a synthetic video corresponding to an audio stream obtained by synthesizing the first video stream 21 or the second video stream 22 with an audio file in the corresponding time period. In a picture-in-picture video with the first video stream 21 and the second video stream 22, the first video stream 21 and the second video stream 22 are simultaneously displayed at each time point.

In some embodiments, if the exported video includes both the first video stream and the second video stream, the exported video further includes timeline information indicating whether the first video stream or the second video stream is displayed in the corresponding display area in the corresponding time period. The timeline may be the latest timeline updated by the terminal or a plurality of timelines recorded by the terminal. When the exported video is played, the user may select the corresponding timeline for play.

In addition, in the synthetic video and picture-in-picture video, there is a timeline showing which video stream is displayed in the display area. Through timeline differentiation, the user may easily know the video stream corresponding to a displayed video picture.

In addition, when users watch (e.g., play or preview) the synthetic video and picture-in-picture video, since the timeline is displayed in a manner of segments, the current video progress may be controlled by operating (e.g., clicking, dragging, etc.) the timeline, and the effect of quickly adjusting and selecting the watched video progress may also be achieved by previous-segment and next-segment options. For example, the user may click the position of the corresponding timeline to make the video quickly jump to be in the video progress at the corresponding time point. In addition, at a certain position of the timeline (for example, left, right, up, down and other appropriate positions of the timeline), the previous-segment and next-segment options or option buttons may be set. The user may quickly adjust the video progress through the options. In some embodiments, the segments are based on switching time points on the timeline. For example, if the previous-segment option is made, the video jumps to a start time point of a previous switching point in the current video progress. For example, the first video stream is played from the 10th sec to the 15th sec, the second video stream is played from the 15th sec to the 20th sec, the first video stream is played from the 20th sec to the 30th sec, and if the previous-segment option is made if the video is played to the 18th sec, the video jumps to the 10th sec and starts to be played from there; and if the next-segment option is made, the video jumps to the 20th sec and starts to be played from there.

In some embodiments, preset processing is performed on the first video stream and the second video stream based on the timeline information. In some embodiments, performing preset processing on the first video stream and the second video stream includes: performing editing on the first video stream and the second video stream. In some embodiments, editing a video to be edited includes: resetting presentation modes of the at least two video streams. For example, a synthetic video may be changed to a picture-in-picture video and vice versa. In some embodiments, editing a video to be edited includes: adjusting the timeline to obtain another timeline. For example, the switching time point of the display area may be changed to obtain a new timeline, so as to allow the video to be presented in a different way.

In some embodiments, different time periods in the timeline information are represented by different visual elements, wherein different time periods correspond to different video streams or different display areas. The visual elements may include color, line form, transparency, etc. For example, the time periods corresponding to different video streams may be distinguished by color, for example, one time period is in red, another time period is in yellow, etc. In addition, if the video stream displayed in the corresponding area is switched, the visual elements may also change accordingly. In some embodiments, by displaying the visual elements, the user may quickly determine a location where the switching operation takes place conveniently. In some embodiments, the display area may be identified by the visual elements, for example, the video stream may be displayed in the first display area if it is in the time period indicated by a first visual element, and the video stream may be displayed in the second display area if it is in the time period indicated by a second visual element.

In some embodiments, if the output state or display area of the first video stream and the second video stream is switched, the visual element changes accordingly. In some embodiments, the output state may include, for example, whether playing is performed, the playing effect (for example, whether background music is added, etc.), whether the volume changes, etc. For example, the visual elements may be kept unchanged when the video stream is played, and may dynamically change when the video stream is paused.

Figure 6:
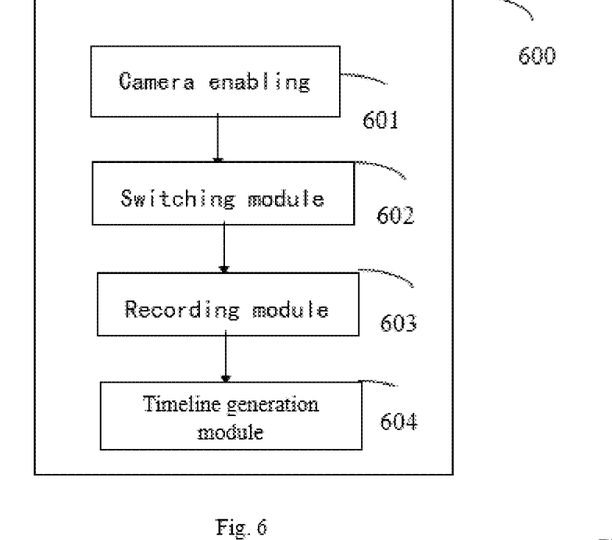
FIG. 6 is a schematic diagram of a video processing device according to an embodiment of the disclosure.

An embodiment of the disclosure further provides a video processing device 600, which includes a camera enabling module 601, a switching module 602, a recording module 603 and a timeline generation module 604. The camera enabling module 601 is configured to turn on a first camera located at a first side of a terminal and turn on a second camera located at a second side of the terminal, so as to obtain a first video stream through the first camera and a second video stream through the second camera. The switching module 602 is configured to receive a switching command and perform a preset switching operation on the first video stream and the second video stream according to the switching command. The recording module 603 is configured to record receiving time of the switching command. The timeline generation module 604 generates timeline information according to the receiving time and the preset switching operation, and the timeline information is used to indicate a corresponding relationship between the receiving time and the switching operation.

In some embodiments, a video playing method is further provided, and includes: receiving a video to be played, wherein the video to be played includes a first video stream, a second video stream and timeline information, and the timeline information indicates a corresponding relationship between receiving time of a switching operation on the first video stream and the second video stream and the switching operation. In some embodiments, the video to be played may be the above-mentioned exported video including the first video stream and the second video stream, which will not be described in detail here. Then, according to the timeline information, the first video stream and the second video stream are correspondingly displayed. It should be understood that the timeline may be one timeline or a plurality of timelines. If there are a plurality of timelines, a corresponding timeline may be selected for video playing.

In some embodiments, a video editing method is further provided, and includes: receiving a video to be edited, wherein the video to be edited includes at least two video streams and timeline information, and the timeline information indicates a corresponding relationship between receiving time of a switching operation on the at least two video streams and the switching operation. In some embodiments, the video to be edited may be the above-mentioned exported video including the first video stream and the second video stream, which will not be described in detail here. Then, based on the timeline information and the at least two video streams, the video to be edited is edited.

In some embodiments, editing the video to be edited includes: resetting presentation modes of the at least two video streams. For example, a synthetic video may be changed to a picture-in-picture video and vice versa. In some embodiments, editing the video to be edited includes: adjusting the timeline to obtain another timeline. For example, the switching time point of the display area may be changed to obtain a new timeline, so as to allow the video to be presented in a different way.

In some embodiments, the timeline information includes time periods divided by time points, and the time points include the receiving time of the switching operation. Editing the video to be edited includes: modifying a playing effect identifier associated with the time period to obtain a video stream corresponding to a playing effect. For example, if a certain playing effect identifier is moved from a first time period to a second time period, if the video stream is output, the video stream corresponding to the second time period is output according to the playing effect. In other embodiments, editing the video to be edited includes: changing time points between the time periods to obtain another timeline. For example, if the switching time point of the first time period and the second time period is adjusted from the 3rd min to the 2nd min, switching is performed at the 2nd min.

In addition, the disclosure further provides a terminal, including at least one memory and at least one processor, wherein the memory is used for storing program codes, and the processor is used for calling the program codes stored in the memory to execute the above-mentioned video processing method.

In addition, the disclosure further provides a computer storage medium which stores program codes for executing the video processing method.

In some embodiments, the video recording is improved by using cameras on two sides of the terminal for video recording, so that more flexible choices may be provided for video presentation and editing. In addition, during video recording, two video streams may be displayed at the same time, allowing the user to know and master captured pictures conveniently. Besides, by displaying multiple video streams through timelines, the user may conveniently know which video stream is played in the current area, and control the video progress and edit the video later. In addition, the timeline display in segments also allows the user to conveniently adjust and select the video progress.

Figure 7:
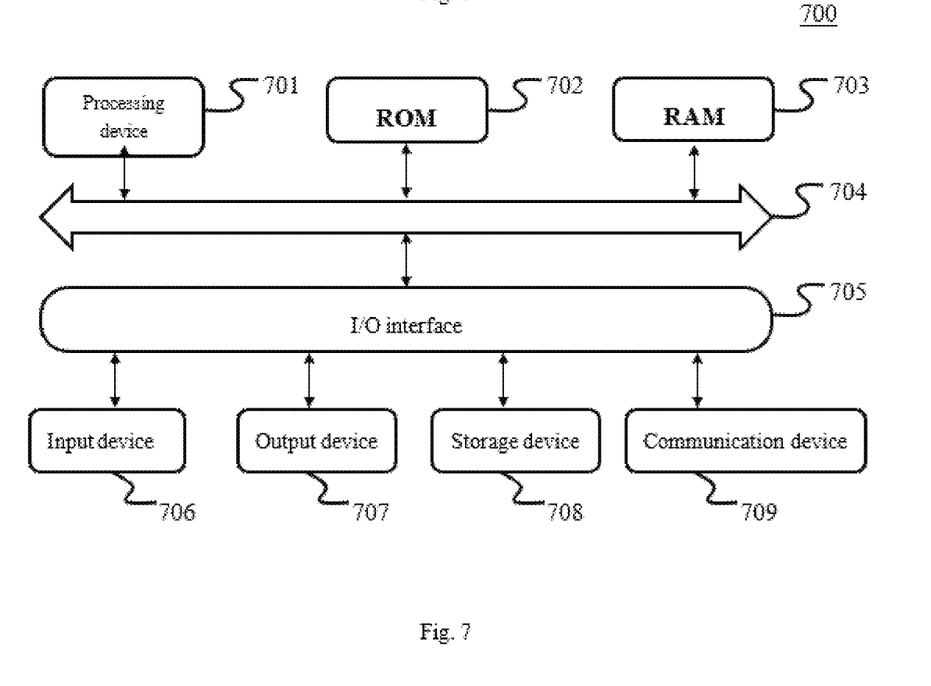
FIG. 7 is a structural schematic diagram of electronic equipment 700 for implementing an embodiment of the disclosure.

Referring next to FIG. 7, it shows a schematic structural diagram of an electronic device 700 suitable for implementing an embodiment of the present disclosure. Terminal devices in the embodiments of the present disclosure may include, but are not limited to, mobile phones, notebook computers, digital broadcast receivers, PDAs (Personal Digital Assistants), PADs (Tablet Computers), PMPs (Portable Multimedia Players), in-vehicle terminals (eg, mobile terminals such as in-vehicle navigation terminals), etc., and stationary terminals such as digital TVs, desktop computers, and the like. The electronic device shown in FIG. 7 is only an example, and should not impose any limitation on the function and scope of use of the embodiments of the present disclosure.

As shown in FIG. 7, an electronic device 700 may include a processing device (e.g., a central processing unit, a graphics processor, etc.) 701 that may be loaded into random access according to a program stored in a read only memory (ROM) 702 or from a storage device 706 Various appropriate actions and processes are executed by the programs in the memory (RAM) 703. In the RAM 703, various programs and data necessary for the operation of the electronic device 700 are also stored. The processing device 701, the ROM 702, and the RAM 703 are connected to each other through a bus 704. An input/output (I/O) interface 705 is also connected to bus 704.

Typically, the following devices may be connected to the I/O interface 705: input devices 706 including, for example, a touch screen, touchpad, keyboard, mouse, camera, microphone, accelerometer, gyroscope, etc.; including, for example, a liquid crystal display (LCD), speakers, vibration an output device 707 of a computer, etc.; a storage device 706 including, for example, a magnetic tape, a hard disk, etc.; and a communication device 709. Communication means 709 may allow electronic device 700 to communicate wirelessly or by wire with other devices to exchange data. Although FIG. 7 shows an electronic device 700 having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product comprising a computer program carried on a non-transitory computer readable medium, the computer program containing program code for performing the method illustrated in the flowchart. In such an embodiment, the computer program may be downloaded and installed from the network via the communication device 609, or from the storage device 706, or from the ROM 702. If the computer program is executed by the processing device 701, the above-mentioned functions defined in the methods of the embodiments of the present disclosure are executed.

It should be noted that the computer-readable medium mentioned above in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination of the above. In this disclosure, a computer-readable storage medium may be any tangible medium that contains or stores a program that can be used by or in conjunction with an instruction execution system, apparatus, or device. In the present disclosure, however, a computer-readable signal medium may include a data signal propagated in baseband or as part of a carrier wave with computer-readable program code embodied thereon. Such propagated data signals may take a variety of forms, including but not limited to electromagnetic signals, optical signals, or any suitable combination of the foregoing. A computer-readable signal medium can also be any computer-readable medium other than a computer-readable storage medium that can transmit, propagate, or transport the program for use by or in connection with the instruction execution system, apparatus, or device. Program code embodied on a computer readable medium may be transmitted using any suitable medium including, but not limited to, electrical wire, optical fiber cable, RF (radio frequency), etc., or any suitable combination of the foregoing.

In some embodiments, the client and server can use any currently known or future developed network protocol such as HTTP (HyperText Transfer Protocol) to communicate, and can communicate with digital data in any form or medium Communication (e.g., communication network) interconnection. Examples of communication networks include local area networks ("LAN"), wide area networks ("WAN"), the Internet (e.g., the Internet), and peer-to-peer networks (e.g., ad hoc peer-to-peer networks), as well as any currently known or future development network of.

The above-mentioned computer-readable medium may be included in the above-mentioned electronic device; or may exist alone without being assembled into the electronic device.

The above-mentioned computer-readable medium carries one or more programs, and if the above-mentioned one or more programs are executed by the electronic device, the electronic device: obtains at least two Internet Protocol addresses; A node evaluation request for an Internet Protocol address, wherein the node evaluation device selects an Internet Protocol address from the at least two Internet Protocol addresses and returns it; receives the Internet Protocol address returned by the node evaluation device; wherein, the obtained The Internet Protocol address indicates an edge node in the content distribution network.

Or, the above computer-readable medium carries one or more programs, and if the one or more programs are executed by the electronic device, the electronic device: receives a node evaluation request including at least two Internet Protocol addresses; From the at least two Internet Protocol addresses, the Internet Protocol address is selected; the selected Internet Protocol address is returned; wherein, the received Internet Protocol address indicates an edge node in the content distribution network.

Computer program code for performing operations of the present disclosure may be written in one or more programming languages, including but not limited to object-oriented programming languages—such as Java, Smalltalk, C++, and This includes conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (eg, using an Internet service provider via Internet connection).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code that contains one or more logical functions for implementing the specified functions executable instructions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or can be implemented in a combination of dedicated hardware and computer instructions.

The units involved in the embodiments of the present disclosure may be implemented in a software manner, and may also be implemented in a hardware manner. Wherein, the name of the unit does not constitute a limitation of the unit itself under certain circumstances, for example, the first obtaining unit may also be described as "a unit that obtains at least two Internet Protocol addresses".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and more.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination of the foregoing. More specific examples of machine-readable storage media would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

According to one or more embodiments of the present disclosure, there is provided a video processing method, comprising: turning on a first camera located at a first side of a terminal so as to obtain a first video stream through the first camera; turning on a second camera located at a second side of the terminal so as to obtain a second video stream through the second camera; receiving a switching command and performing a preset switching operation on the first video stream and the second video stream according to the switching command; recording receiving time of the switching command; and generating timeline information according to the receiving time and the preset switching operation, the timeline information being used to indicate a corresponding relationship between the receiving time and the preset switching operation.

According to one or more embodiments of the present disclosure, the method further comprising: displaying the first video stream and the second video stream simultaneously, and displaying the first video stream in a first area of a display interface and the second video stream in a second area of the display interface; and performing the preset switching operation on the first video stream and the second video stream according to the switching command comprises: exchanging a display area where the first video stream is located and a display area where the second video stream is located.

According to one or more embodiments of the present disclosure, the method further comprising: enabling one of the first camera and the second camera to be in an on state and the other one of the first camera and the second camera to be in an off state at the same moment; and performing the preset switching operation on the first video stream and the second video stream according to the switching command comprises: turning off the one, which is in the on state, of the first camera and the second camera and turning on the other one, which is in the off state, of the first camera and the second camera.

According to one or more embodiments of the present disclosure, the method further comprising: turning on the first camera and the second camera simultaneously, wherein the first side and the second side are opposite.

According to one or more embodiments of the present disclosure, the method further comprising: obtaining an audio stream, wherein the audio stream is used to be synthesized with the first video stream and/or the second video stream, so that an obtained video has corresponding audio.

According to one or more embodiments of the present disclosure, a size of the first area is different from that of the second area; or the first area is located in the second area; or the first area and the second area have no overlapping part.

According to one or more embodiments of the present disclosure, when a video obtained by the method is watched, the video which has the first video stream and the second video stream and contains the timeline information is displayed.

According to one or more embodiments of the present disclosure, during being watched, in response to a preset operation, causing display areas of the first video stream and the second video stream to be switched, and after the switching, updating is performed to obtain updated timeline information corresponding to the display of the first video stream and the second video stream.

According to one or more embodiments of the present disclosure, the method further comprising: outputting the timeline information.

According to one or more embodiments of the present disclosure, the method further comprising: displaying the timeline information which includes time periods divided by time points, the time points including time points at which switching operations occur, and the time periods corresponding to switching information; receiving an adjustment command, and determining a time period corresponding to the adjustment command; and adjusting switching information of the time period according to the adjustment command.

According to one or more embodiments of the present disclosure, receiving the adjustment command and determining the time period corresponding to the adjustment command comprises: receiving a preset trigger operation and determining a trigger position corresponding to the preset trigger operation; and determining a time period corresponding to the trigger position on the timeline information based on a display position of the timeline information.

According to one or more embodiments of the present disclosure, the timeline information is displayed in a manner of segments, and a time point of a displayed video is controlled by selecting a previous segment and a next segment of the timeline information through option buttons.

According to one or more embodiments of the present disclosure, the method further comprising: performing preset processing on the first video stream and the second video stream based on the timeline information.

According to one or more embodiments of the present disclosure, performing preset processing on the first video stream and the second video stream comprises: exporting the first video stream and/or the second video stream and the timeline information to obtain an exported video.

According to one or more embodiments of the present disclosure, the exported video comprises the first video stream and the second video stream as well as the timeline information, and another timeline information is generated in response to another switching command on the exported video.

According to one or more embodiments of the present disclosure, performing preset processing on the first video stream and the second video stream comprises: performing editing on the first video stream and the second video stream, and the editing comprises: resetting presentation modes of the first video stream and the second video stream; or adjusting the timeline information to obtain another timeline information.

According to one or more embodiments of the present disclosure, different time periods in the timeline information are represented by different visual elements, wherein different time periods correspond to different video streams or different display areas.

According to one or more embodiments of the present disclosure, if output states or display areas of the first video stream and the second video stream are switched, the visual element changes accordingly.

According to one or more embodiments of the present disclosure, there is provided a video processing device, comprising: a camera enabling module, configured to turn on a first camera located at a first side of a terminal and turn on a second camera located at a second side of the terminal, so as to obtain a first video stream through the first camera and a second video stream through the second camera; a switching module, configured to receive a switching command and perform a preset switching operation on the first video stream and the second video stream according to the switching command; a recording module, configured to record receiving time of the switching command; and a timeline generation module, configured to generate timeline information according to the receiving time and the preset switching operation, the timeline information being used to indicate a corresponding relationship between the receiving time and the switching operation.

According to one or more embodiments of the present disclosure, there is provided a video playing method, comprising: receiving a video to be played, wherein the video to be played comprises a first video stream, a second video stream and timeline information, and the timeline information indicates a corresponding relationship between receiving time of a switching operation on the first video stream and the second video stream and the switching operation; and correspondingly displaying the first video stream and the second video stream according to the timeline information.

According to one or more embodiments of the present disclosure, there is provided a video editing method, comprising: receiving a video to be edited, wherein the video to be edited comprises at least two video streams and timeline information, and the timeline information indicates a corresponding relationship between receiving time of a switching operation on the at least two video streams and the switching operation; and editing the video to be edited based on the timeline information and the at least two video streams.

According to one or more embodiments of the present disclosure, editing the video to be edited comprises: resetting presentation modes of the at least two video streams; or adjusting the timeline information to obtain another timeline information.

According to one or more embodiments of the present disclosure, the timeline information comprises time periods divided by time points, and the time points comprise receiving time of the switching operation;

Editing the video to be edited comprises: modifying a playing effect identifier associated with the time period to obtain a video stream corresponding to a playing effect, or changing time points between the time periods to obtain another timeline.

According to one or more embodiments of the present disclosure, there is provided a terminal, comprising: at least one memory and at least one processor; wherein the memory is used for storing program codes, and the processor is used for calling the program codes stored in the memory to execute the video processing method above.

According to one or more embodiments of the present disclosure, there is provided a computer storage medium, storing program codes for executing the video processing method above.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, the technical solutions formed by the above-mentioned technical features or Other technical solutions formed by any combination of its equivalent features. For example, a technical solution is formed by replacing the above features with the technical features disclosed in the present disclosure (but not limited to) with similar functions.

Additionally, although operations are depicted in a particular order, this should not be construed as requiring that the operations be performed in the particular order shown or in a sequential order. Under certain circumstances, multitasking and parallel processing may be advantageous. Likewise, although the above discussion contains several implementation-specific details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or logical acts of method, it is to be understood that the subject matter defined in the appended claims is not necessarily limited to the specific features or acts described above. Rather, the specific features and acts described above are merely example forms of implementing the claims.

The invention claimed is:

1. A video processing method, comprising:
    turning on a first camera located at a first side of a terminal so as to obtain a first video stream through the first camera;
    turning on a second camera located at a second side of the terminal so as to obtain a second video stream through the second camera;
    simultaneously displaying the first video stream and the second video stream in a first area and a second area of a same display screen, respectively;
    receiving a switching command and performing a preset switching operation on the first video stream and the second video stream according to the switching command;
    in response to the switching command, switching display areas by displaying the first video stream in the second area and displaying the second video stream in the first area;
    recording a receipt time of receiving the switching command configured to switch the display areas of simultaneously displaying the first video stream and the second video stream on the same display screen;
    generating timeline information according to the receipt time and the preset switching operation, the timeline information indicating a corresponding relationship between the receipt time and the switch of the display areas of simultaneously displaying the first video stream and the second video stream on the same display screen; and
    simultaneously displaying a timeline on the same display screen where the first video stream and the second video stream are simultaneously displayed, wherein the timeline is generated based on the timeline information indicating the corresponding relationship between the receipt time and the switch of the display areas of simultaneously displaying the first video stream and the second video stream on the same display screen, wherein the timeline indicates a plurality of time periods during each of which the first video stream or the second video stream is displayed in one of the first area and the second area on the same display screen, wherein the timeline comprises different visual elements configured to differentiate a first time period from a second time period, wherein the first time period and the second time period are among the plurality of time periods, wherein the first video stream is displayed in the one of the first area and the second area on the same display screen during the first time period, wherein the second video stream is displayed in the one of the first area and the second area on the same display screen during the second time period, wherein the different visual elements representing the first time period and the second time period are simultaneously displayed on the same display screen where the first video stream and the second video stream are simultaneously displayed, wherein one of the different visual elements indicates that the first video stream is displayed in the one of the first area and the second area on the same display screen, and wherein another of the different visual elements indicates that the second video stream is displayed in the one of the first area and the second area on the same display screen.

2. The method according to claim 1, further comprising:
    enabling one of the first camera and the second camera to be in an on state and the other one of the first camera and the second camera to be in an off state at the same moment; and
    performing the preset switching operation on the first video stream and the second video stream according to the switching command comprises:
    turning off the one, which is in the on state, of the first camera and the second camera and turning on the other one, which is in the off state, of the first camera and the second camera.

3. The method according to claim 2, further comprising:
    turning on the first camera and the second camera simultaneously, wherein the first side and the second side are opposite;
    the video processing method further comprising:
    obtaining an audio stream, wherein the audio stream is used to be synthesized with the first video stream and/or the second video stream, so that an obtained video has corresponding audio.

4. The method according to claim 2, wherein a size of the first area is different from that of the second area; or
    the first area is located in the second area; or
    the first area and the second area have no overlapping part.

5. The method according to claim 2, wherein when a video obtained by the method is watched, the video which has the first video stream and the second video stream and contains the timeline information is displayed.

6. The method according to claim 5, wherein during being watched, in response to a preset operation, causing display areas of the first video stream and the second video stream to be switched, and after the switching, updating is performed to obtain updated timeline information corresponding to the display of the first video stream and the second video stream.

7. The method according to claim 1, further comprising:
displaying the timeline information which includes time periods divided by time points, the time points including time points at which switching operations occur, and the time periods corresponding to switching information;
receiving an adjustment command, and determining a time period corresponding to the adjustment command; and
adjusting switching information of the time period according to the adjustment command.

8. The method according to claim 7, wherein receiving the adjustment command and determining the time period corresponding to the adjustment command comprises:
receiving a preset trigger operation and determining a trigger position corresponding to the preset trigger operation; and
determining a time period corresponding to the trigger position on the timeline information based on a display position of the timeline information.

9. The method according to claim 7, wherein different time periods in the timeline information are represented by different visual elements, wherein different time periods correspond to different video streams or different display areas.

10. The method according to claim 9, wherein if output states or display areas of the first video stream and the second video stream are switched, the visual element changes accordingly.

11. The method according to claim 1, wherein the timeline information is displayed in a manner of segments, and a time point of a displayed video is controlled by selecting a previous segment and a next segment of the timeline information through option buttons.

12. The method according to claim 1, further comprising:
outputting the timeline information;
and/or,
performing preset processing on the first video stream and the second video stream based on the timeline information.

13. The method according to claim 12, wherein performing preset processing on the first video stream and the second video stream comprises: exporting the first video stream and/or the second video stream and the timeline information to obtain an exported video.

14. The method according to claim 13, wherein the exported video comprises the first video stream and the second video stream as well as the timeline information, and another timeline information is generated in response to another switching command on the exported video.

15. The method according to claim 12, wherein performing preset processing on the first video stream and the second video stream comprises: performing editing on the first video stream and the second video stream, and the editing comprises:
resetting presentation modes of the first video stream and the second video stream; or
adjusting the timeline information to obtain another timeline information.

16. A video playing method, comprising:
receiving a video to be played, wherein the video to be played comprises a first video stream, a second video stream and timeline information, and the timeline information indicates a corresponding relationship between a receipt time of receiving a switching command configured to switch display areas of simultaneously displaying the first video stream and the second video stream on a same display screen and a switch of the display areas of simultaneously displaying the first video stream and the second video stream on the same display screen;
correspondingly displaying the first video stream and the second video stream according to the timeline information, wherein the correspondingly displaying the first video stream and the second video stream according to the timeline information further comprises:
simultaneously displaying the first video stream and the second video stream in a first area and a second area of the same display screen, respectively, and
switching the display areas by displaying the first video stream in the second area and displaying the second video stream in the first area based on the timeline information; and
simultaneously displaying a timeline on the same display screen where the first video stream and the second video stream are simultaneously displayed, wherein the timeline is generated based on the timeline information indicating the corresponding relationship between the receipt time and the switch of the display areas of simultaneously displaying the first video stream and the second video stream on the same display screen, wherein the timeline indicates a plurality of time periods during each of which the first video stream or the second video stream is displayed in one of the first area and the second area on the same display screen, wherein the timeline comprises different visual elements configured to differentiate a first time period from a second time period, wherein the first time period and the second time period are among the plurality of time periods, wherein the first video stream is displayed in the one of the first area and the second area on the same display screen during the first time period, wherein the second video stream is displayed in the one of the first area and the second area on the same display screen during the second time period, wherein the different visual elements representing the first time period and the second time period are simultaneously displayed on the same display screen where the first video stream and the second video stream are simultaneously displayed, wherein one of the different visual elements indicates that the first video stream is displayed in the one of the first area and the second area on the same display screen, and wherein another of the different visual elements indicates that the second video stream is displayed in the one of the first area and the second area on the same display screen.

17. A video editing method, comprising:
receiving a video to be edited, wherein the video to be edited comprises at least two video streams and timeline information, and the timeline information indicates a corresponding relationship between a receipt time of receiving a switching command configured to switch display areas of simultaneously displaying the at least two video streams on a same display screen and a switch of the display areas of simultaneously displaying the at least two video streams on the same display screen;

editing the video to be edited based on the timeline information and the at least two video streams, wherein the editing the video to be edited based on the timeline information and the at least two video streams further comprises:
  simultaneously displaying the at least two video streams in different areas of the same display screen, and
  switching the display areas of displaying the at least two video streams on the same display interface; and
simultaneously displaying a timeline on the same display screen where the at least two video streams are simultaneously displayed, wherein the timeline is generated based on the timeline information indicating the corresponding relationship between the receipt time and the switch of the display areas of simultaneously displaying the first video stream and the second video stream on the same display screen, wherein the timeline indicates a plurality of time periods during each of which the first video stream or the second video stream is displayed in one of the first area and the second area on the same display screen, wherein the timeline comprises different visual elements configured to differentiate a first time period from a second time period, wherein the first time period and the second time period are among the plurality of time periods, wherein the first video stream is displayed in the one of the first area and the second area on the same display screen during the first time period, wherein the second video stream is displayed in the one of the first area and the second area on the same display screen during the second time period, wherein the different visual elements representing the first time period and the second time period are simultaneously displayed on the same display screen where the first video stream and the second video stream are simultaneously displayed, wherein one of the different visual elements indicates that the first video stream is displayed in the one of the first area and the second area on the same display screen, and wherein another of the different visual elements indicates that the second video stream is displayed in the one of the first area and the second area on the same display screen.

18. The video editing method according to claim 17, wherein editing the video to be edited comprises:
  resetting presentation modes of the at least two video streams; or
  adjusting the timeline information to obtain another timeline information.

19. The video editing method according to claim 18, wherein
  the timeline information comprises time periods divided by time points, and the time points comprise receiving time of the switching operation; and
  editing the video to be edited comprises: modifying a playing effect identifier associated with the time period to obtain a video stream corresponding to a playing effect, or changing time points between the time periods to obtain another timeline.

20. A terminal, comprising:
  at least one memory and at least one processor;
  wherein the memory is used for storing program codes, and the processor is used for calling the program codes stored in the memory to execute operations comprising:
    turning on a first camera located at a first side of a terminal so as to obtain a first video stream through the first camera;
    turning on a second camera located at a second side of the terminal so as to obtain a second video stream through the second camera;
    simultaneously displaying the first video stream and the second video stream in a first area and a second area of a same display screen, respectively;
    receiving a switching command and performing a preset switching operation on the first video stream and the second video stream according to the switching command;
    in response to the switching command, switching display areas by displaying the first video stream in the second area and displaying the second video stream in the first area;
    recording a receipt time of receiving the switching command configured to switch the display areas of simultaneously displaying the first video stream and the second video stream on the same display screen;
    generating timeline information according to the receiving time and the preset switching operation, the timeline information indicating a corresponding relationship between the receipt time and the switch of the display areas of simultaneously displaying the first video stream and the second video stream on the same display screen; and
    simultaneously displaying a timeline on the same display screen where the first video stream and the second video stream are simultaneously displayed, wherein the timeline is generated based on the timeline information indicating the corresponding relationship between the receipt time and the switch of the display areas of simultaneously displaying the first video stream and the second video stream on the same display screen, wherein the timeline indicates a plurality of time periods during each of which the first video stream or the second video stream is displayed in one of the first area and the second area on the same display screen, wherein the timeline comprises different visual elements configured to differentiate a first time period from a second time period, wherein the first time period and the second time period are among the plurality of time periods, wherein the first video stream is displayed in the one of the first area and the second area on the same display screen during the first time period, wherein the second video stream is displayed in the one of the first area and the second area on the same display screen during the second time period, wherein the different visual elements representing the first time period and the second time period are simultaneously displayed on the same display screen where the first video stream and the second video stream are simultaneously displayed, wherein one of the different visual elements indicates that the first video stream is displayed in the one of the first area and the second area on the same display screen, and wherein another of the different visual elements indicates that the second video stream is displayed in the one of the first area and the second area on the same display screen.

* * * * *